Patented Aug. 25, 1936

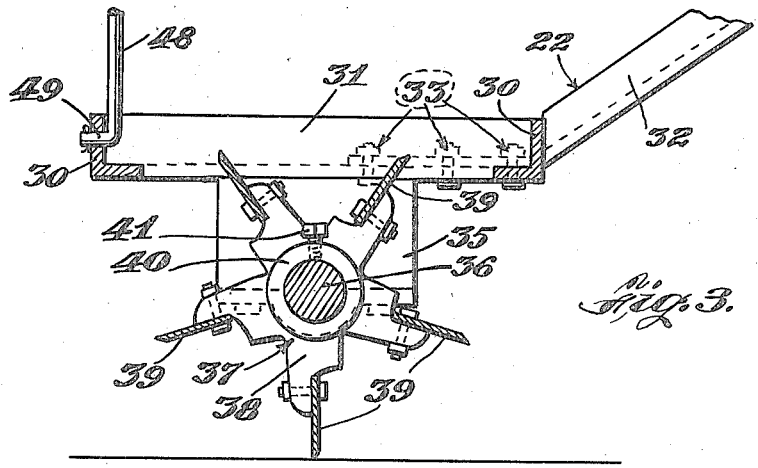
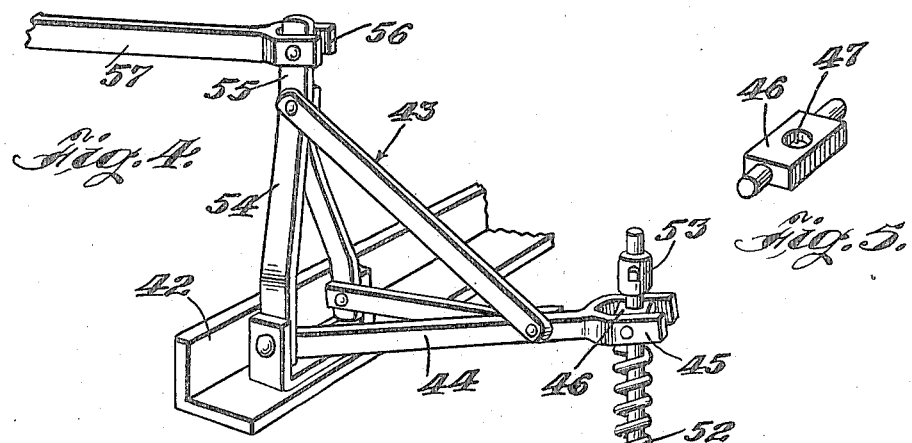
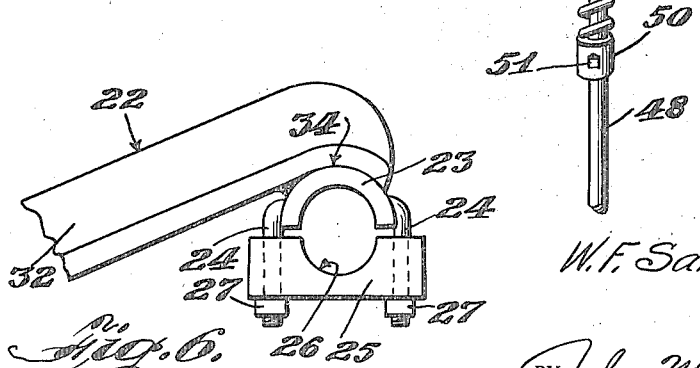

2,052,114

UNITED STATES PATENT OFFICE 2,052,114

TRACTOR STALK CUTTER AND PLOW

Walter Freeman Sanders, Frost, Tex.

Application June 10, 1935, Serial No. 25,744

2 Claims. (Cl. 97—47)

This invention relates to farming machines and more particularly to a combined stalk cutter and plow.

In preparing a field, on which stalked plants were previously grown, for replanting, it is the customary practice to first go over the field with a stalk cutter and thereafter break up the soil with a buster plow or the like, which, of course, requires considerable time due to the two separate operations, to say nothing of the cost. So, too, in cases where the stalks are rank or green and naturally much tougher than when dried out it is a much more laborious task.

The present invention, therefore, has for its principal object to produce a machine by which the stalks, in whatever condition, are readily and effectively cut and the land bedded and the plowing accomplished immediately therewith.

The invention consists in the general novel structure of the machine and in the parts and combinations and arrangements of parts thereof as hereinafter described and pointed out with particularity in the appended claims.

In the accompanying drawings forming part of this specification and illustrating a practical adaptation of the invention,—

Figure 3 is a fragmentary longitudinal vertical section, on an enlarged scale, the section being taken substantially on the line 3—3 of Figure 1;

Figure 4 is a fragmentary perspective view showing details of the controlling levers and spring tension means for the stalk cutting element;

Figure 5 is a detail view of the swivel block through which the supporting and tension rod for the stalk cutting element works; and Figure 6 is a fragmentary view, in side elevation, showing details of the forward end portion of the adjustable carrier frame of the stalk cutting element.

Figure 1:
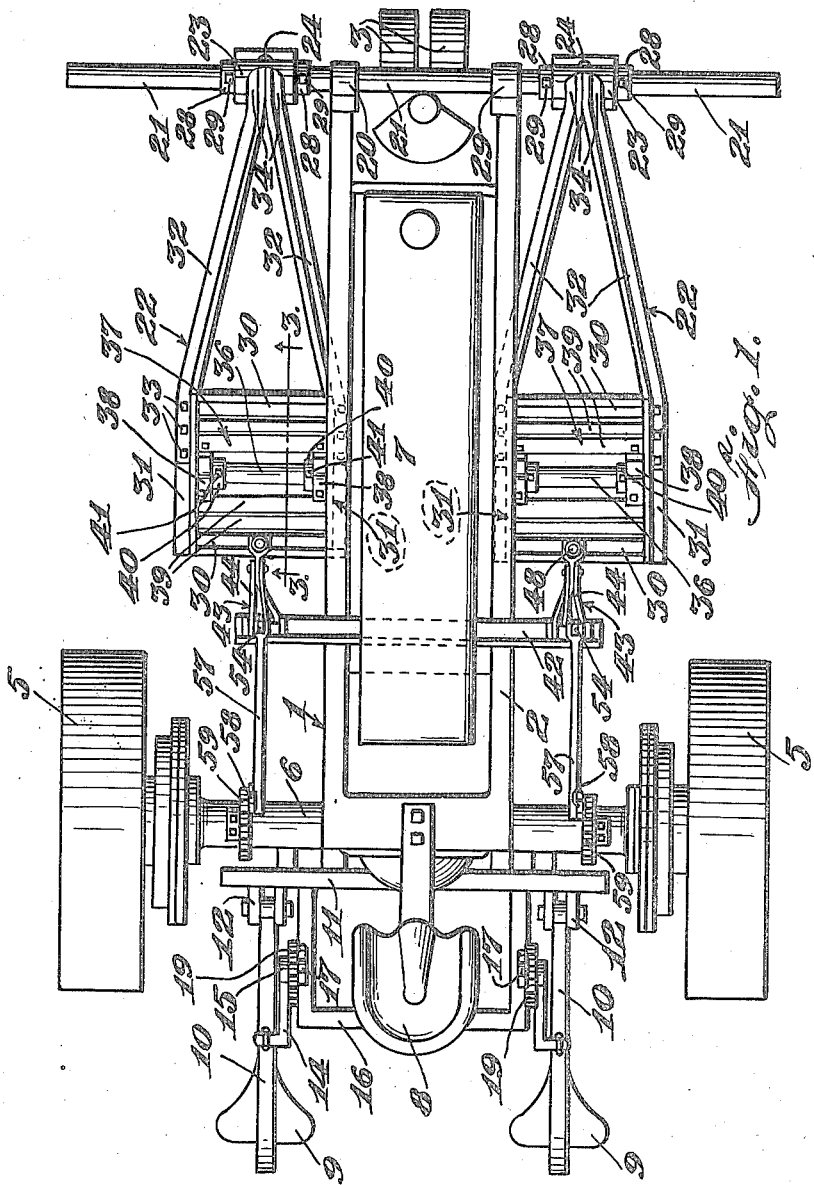
Figure 1 is a top plan view of a complete machine.

Referring now to the drawings, the numeral 1 designates generally an ordinary farm tractor, including the body frame or chassis 2 provided with the front ground wheels 3 which are journaled on a supplemental under axle frame 4 mounted on the body frame or chassis to turn on a vertical axis whereby the tractor is steered through the instrumentality of the steering mechanism (not shown).

At the rear of the body frame or chassis 2 are the traction wheels 5 which are mounted on the driving axle casing 6 in the usual manner and driven from the motor (not shown) which is housed in the hood 7 on the forward portion of the body frame or chassis and connected to the driving axle through the transmission mechanism (not shown).

The tractor is provided with the usual seat 8 for the driver, from which position the operation of the tractor is controlled as well as the various manipulating levers for the respective soil working elements to be presently described.

As shown, two plows 9 are located at the rear of the tractor, each plow being independently mounted and manipulated with relation to the other, by being respectively mounted on the end of a hooked carrier arm 10 which is pivotally mounted on a cross bar or frame member 11, as at 12. The carrier arms 10 are connected by chains 13 to crank arms 14 pivotally mounted, as at 15, on a rear underframe extension 16 of the body frame or chassis 2. Each crank arm 14 is provided with an operating and controlling lever 17 having the usual hand release 18 for a latch (not shown) which is engaged with and released from a toothed sector 19, by the operation of which lever 17 the plow 9 is raised and lowered, at will, and in either raised or lowered position the plow is so held by the latch engaged in the toothed sector, as is obvious and well known in this particular art.

Mounted in supporting brackets 20, at the front end of the body frame or chassis 2, is a cross bar or beam 21, preferably of round cross section. At opposite sides of the body frame or chassis are two vertically swingable frames 22, the forward end portion of each frame having welded or otherwise attached thereto a bracket member 23 of half round cross section to fit rotatably as well as endwise slidable on said cross bar or beam 21. As shown, the bracket member 23 is provided at opposite sides with depending studs or bolt extensions 24 which are projected through apertures provided therefor in a cooperating block 25 having a counterpart rounded seat 26 to fit said cross bar or beam 21, the end portions of the studs or bolt extensions 24 being screwthreaded to receive securing nuts 27. Sleeved on the cross bar or beam 21, at the opposite ends of the bracket member 23, are collars 28 which are fastened to the bar or beam 21 by set screws 29, by which provision the frame 22 is readily adjustable, at will, lengthwise of said bar or beam 21, when it is desired to place the frame 22 at any distance from the longitudinal median line or center of the tractor, depending upon the width between the rows of stalks to be cut and the furrows to be cut by the plows 9, it being understood, of course, that the plows are respectively placed to follow in alinement with the stalk cutting elements to be presently described and which are carried by said vertically swingable frames 22.

The rear portions of the frames 22 are rectangular. As shown, each comprises a pair of transverse members 30 of angle iron section, that is L-shape in cross section, with their horizontal flanges lowermost and disposed inwardly in the frame. The two longitudinal side members 31 are of the same cross section, but their horizontal flanges are disposed outwardly. The four frame members 30, 31, may be obviously welded together at their meeting ends, but, of course, may be otherwise secured, or this portion of the frame may obviously be an integral casting, as far as the present invention is concerned.

The forward portion of the vertically swingable frame 22 preferably comprises two members 32 of L-shape cross section, with their rear end portions bolted, riveted, or otherwise secured, as at 33, to the side members 31 of the rectangular frame portion. These members 32 incline upwardly from the members 31 and convergently to the bracket member 23 to which their forward ends are attached, as at 34, in the manner hereinbefore described.

Journaled to rotate freely in bearings 35 mounted on the undersides of the longitudinal members 31 of each rectangular frame portion is the spindle 36 of a stalk cutting element 37. The cutting element comprises a pair of spider members 38, on the arms of which are secured radial blades 39. The hub portions 40 of the spider members are fastened to the spindle 36 by set screws 41.

Mounted on a cross member 42 of the body frame or chassis 2 are bell crank lever frames 43, each of said frames comprising a forwardly extending substantially horizontal Y-shape arm 44, at the end of which is a bifurcated extension 45 having mounted therein a swivel block 46. The block 46 is provided with an aperture 47 (see Figure 5) through which a supporting and tension rod 48 slides, the lower end portion of said rod being hooked, as at 49 (see Figure 3), and fitted to pivot in an aperture provided therefor in the vertical flange of the rear cross member 30 of the rectangular portion of the vertically swingable frame 22.

Sleeved on the supporting and tension rod 48, between an adjustable collar 50, normally fastened to the rod by a set screw 51, and the swivel block 46, is a coiled spring 52. Above the block 46 the rod 48 is provided with an adjustable collar 53, and, preferably, there is normally allowed some clearance space or play between the collar and the swivel block 46, as shown more clearly in Figure 4, for a purpose to be presently more fully explained.

The vertical arm 54 of the bell crank lever frame has an end extension 55, to which is pivotally attached the bifurcated end portion 56 of a link bar 57 which has its opposite end portion pivotally attached to an operating and controlling lever 58, it being understood that this same operating and controlling arrangement is provided for the vertically swingable frames 22 on each side of the tractor.

The operating and controlling levers 58, which, of course, are independently operable, are each pivotally mounted adjacent a toothed sector 59 (conventionally shown in Figure 1) and provided with a hand release 60 and latch rod 61, which latter is movable into and out of engagement with the toothed sector 59 and by which arrangement the operating and controlling lever 58 is manipulable to raise and lower the vertically swingable frame 22, said frame being held in its adjusted position by the engagement of the latch element 61 with the toothed sector 59.

In the operation of the machine, the plows 9 are lowered, at will, to working position and raised from said position by the operator selectively manipulating the respective levers 17, which is conveniently accomplished from his position on the seat 8. Likewise, from the same position, the operator has within convenient reach the levers 58 for raising and lowering the vertically swingable frames 22, at will.

Figure 2:
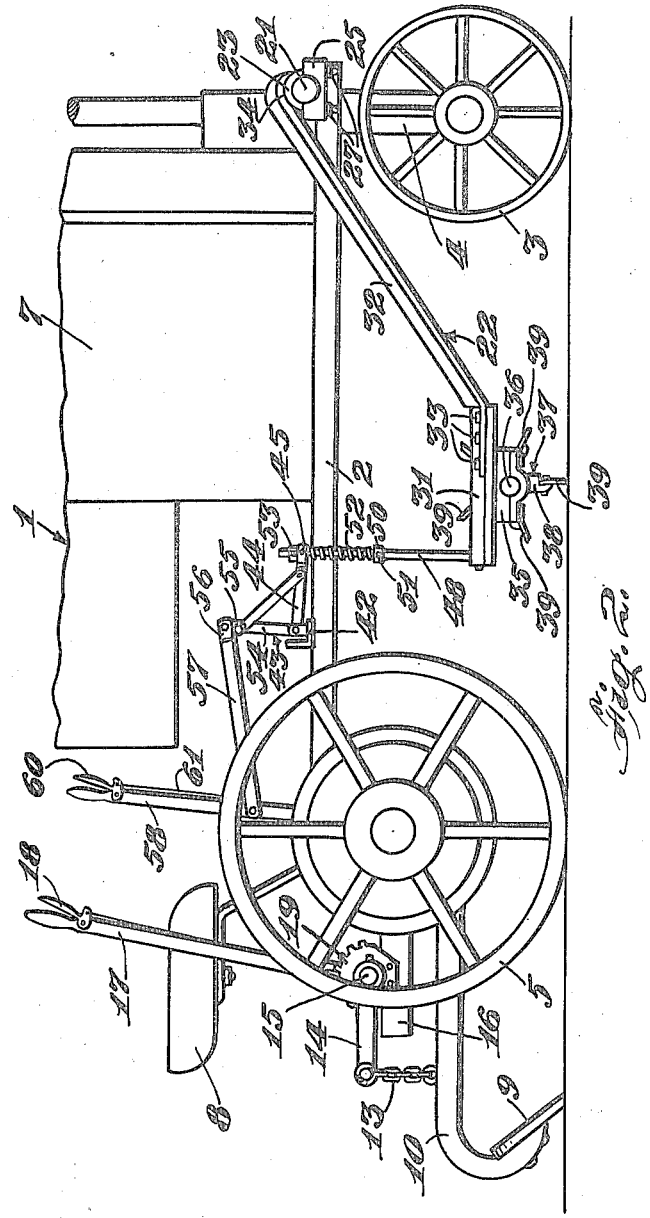
Figure 2 is a side elevation thereof.

When the frames 22 are lowered to working position, as shown in Figures 2 and 3, the stalk cutting elements ride on the ground, either by gravity alone and under the weight of the respective frames 22, but, under some conditions, particularly in cases where the stalks are rank or green and considerable pressure on the cutting elements is necessary to effect the cutting and disintegration of the stalks, the levers 58 are pressed forwardly, thereby correspondingly operating the bell crank frames 43 and depressing the swivel blocks 46 to compress the spring elements 52 and creating tension sufficient to press the cutting elements strongly in contact with the ground to effectively destroy the stalks, yet the spring elements 52 yield to prevent damage to the parts should the cutting elements come in contact with an unusually hard surface or obstruction in the path thereof.

By the use of a machine in accordance with the present invention stubble and stalked fields are prepared for plowing with relative ease and facility and the plowing accomplished immediately therewith in one operation, that is to say, with one and the same machine and during one passage of the machine over the field. The peculiar pivotal mounting of the vertically swingable frames 22 with the normal clearance between the swivel block 46 and collar 53 on the rod 48 is of material advantage in the machine of the present invention, in that such provision and arrangement permits the bell crank lever frame 43 to be forcibly rocked on its pivot through the instrumentality of the connected operating lever 58 in the hand of the operator, whereby the swivel block 46 is struck against the collar 53 in a quick succession of strokes and thereby imparting sudden jarring effect to the stalk cutting elements to shake loose therefrom clods of soil or other adhering matter that may have accumulated on the blades 39 or the spider members 38 and might interfere with the operation of the cutting elements. So, too, the provision for lateral adjustment of the vertically swingable frames 22 is of practical advantage as the cutting elements can be located to track on rows of the stalked field at different distances between them.

It is understood that as far as the broad contemplation of the invention is concerned the plows and stalk cutting elements of the machine can be raised and lowered by means of power lifting mechanism of the character usually provided on farm tractors.

Obviously, the machine may be modified in many respects without departing from the spirit and scope of the invention as defined in the appended claims. The invention, therefore, is not limited to the specific construction and arrangement shown in the accompanying drawings.

What is claimed is:

1. In a machine of the character described, a tractor, a cross beam mounted on the forward portion of the tractor and extending beyond the side of the tractor, a carrier frame comprising a substantially Y-shape forward portion, means for pivotally attaching the converged forward end portion of said frame on said cross beam with provision for adjustment lengthwise of the beam, said carrier frame having a rectangular rear end portion, a peripherally bladed stalk cutting element rotatably mounted in said rectangular frame portion, a supporting rod pivotally attached at its lower end portion to the rear side of said rectangular frame portion and extending upwardly therefrom, a bell crank lever element, a swivel block on one arm of said bell crank lever element, said block having an aperture therein, said supporting rod slidably fitted in the aperture of said swivel block, a collar on said supporting rod below said swivel block, a coiled spring sleeved on said rod between said collar and said swivel block, a collar on said rod above said swivel block, an operating and controlling lever, and a link connecting said lever and the arm of said bell crank lever element opposite to the arm on which said swivel block is located.

2. The combination set forth in claim 1, and the collar on said supporting rod above said swivel block being normally spaced from the block and the spring on said rod being normally without compression.

WALTER FREEMAN SANDERS.